United States Patent [19]

Kawashima

[11] Patent Number: 5,463,427
[45] Date of Patent: Oct. 31, 1995

[54] DYNAMIC FOCUSING DEVICE FOR CATHODE RAY TUBE

[75] Inventor: Masahiro Kawashima, Takatsuki, Japan

[73] Assignee: Matsushita Electric Industrial Co., Ltd., Osaka, Japan

[21] Appl. No.: 128,129

[22] Filed: Sep. 29, 1993

[51] Int. Cl.$^6$ .............................. H04N 9/28; H04N 3/26
[52] U.S. Cl. ................ 348/806; 348/807; 348/745; 315/368.11; 315/368.12; 315/368.13
[58] Field of Search ........................ 348/745, 746, 348/747, 805, 806, 807, 744; 313/412, 414, 415, 436, 442, 452; 325/11.5, 368.11, 368.12, 368.13, 368.15, 368.18, 368.21, 368.24, 377; H04N 9/28, 9/285, 3/26

[56] References Cited

U.S. PATENT DOCUMENTS

| | | | |
|---|---|---|---|
| 4,549,117 | 10/1985 | Takahashi et al. | 348/175 |
| 4,672,275 | 6/1987 | Ando | 348/745 |
| 5,016,075 | 5/1991 | Kii | 348/806 |
| 5,111,284 | 5/1992 | Tsujihara et al. | 348/747 |
| 5,216,497 | 6/1993 | Tsujihara et al. | 348/745 |

FOREIGN PATENT DOCUMENTS

| | | | |
|---|---|---|---|
| 2-26184 | 1/1990 | Japan. | |
| 0050982 | 3/1991 | Japan | H04N 9/28 |

Primary Examiner—James J. Groody
Assistant Examiner—Michael H. Lee
Attorney, Agent, or Firm—Willian Brinks Hofer Gilson & Lione

[57] ABSTRACT

A dynamic focusing device for cathode ray tubes comprising a crosshatch pattern generator for providing a surface of cathode ray tubes with a crosshatch pattern indicating an adjustment point at which focusing control is carried out. The system uses correction data to achieve proper focus at each adjustment point, i.e., the intersection of the vertical and horizontal lines of the crosshatch pattern defined by arbitrarily divided blocks on the surface of the cathode ray tube. The data between adjacent adjustment points is interpolated in the vertical and horizontal directions to supply an output signal providing proper dynamic focus of the cathode ray tube. The disclosed device produces proper focus uniformity and is able to produce a high definition television image on direct-view devices or projection systems which utilize cathode ray tubes.

5 Claims, 4 Drawing Sheets

INTERPOLATION EQUATION $$Di = (D(a) - D(b)) \times i/n + D(b)$$

D(a) : CORRECTION DATA OF ADJUSTMENT POINT P1
D(b) : CORRECTION DATA OF ADJUSTMENT POINT P2
Di : INTERPOLATION VALUE OF i LINE FROM D(b)
n: NUMBER OF SCANNING LINE BETWEEN ADJUSTMENT POINTS

SCANNING LINE BETWEEN ADJUSTMENT POINTS

LINEAR APPROXIMATION 5,463,427

DYNAMIC FOCUSING DEVICE FOR CATHODE RAY TUBE

FIELD OF THE INVENTION

The present invention relates to a dynamic focusing device for cathode ray tubes, and in particular to a device for producing a visual image which has proper focus uniformity on the entire surface of direct-view television devices, or on projection television systems which utilize cathode ray tubes.

BACKGROUND OF THE INVENTION

Image display devices using cathode ray tubes are widely used for many applications, such as the representation of visual images ranging from the realistic scenes of entertainment television to the complex graphics and coded data generated by information processing systems, such as computers and the like. High definition television displays are one example of the recent trend towards utilizing cathode ray tubes. To ensure satisfactory performance, it is necessary that an electron beam be properly focused over the entire fluorescent surface of the cathode ray tube. Furthermore, in projection television systems, it is necessary to produce proper focus uniformity, because the enlarged image is projected onto the remote screen.

Within the cathode ray tube, therefore, it has become desirable to change the conventional focus condition, because the distance from the deflection point of the beam to the periphery of the surface is longer than the distance from the deflection point to the center of the surface. The conventional method of changing the focus condition in order to focus the electron beam over the entire surface is to apply a parabolic compensation signal, synchronized to a horizontal and a vertical synchronizing signal, to a focus coil or a focus electrode of the cathode ray tube. However, this method is insufficient to meet the severe focusing requirements of high definition television and projection systems because of the following problems: 1) the processing measure error of the cathode ray tube; 2) the dimension and location errors of several electrodes; and 3) the aberration of the electron beam spot.

Thus, there exists a need in the art for a dynamic focusing device that overcomes the limitations of the prior art and achieves the important advantages of providing proper focus uniformity over the entire surface of a cathode ray tube, so as to meet the stringent focusing demands of high definition televisions and projection systems.

SUMMARY OF THE INVENTION

A general object of the present invention is therefore to provide a dynamic focusing device for cathode ray tubes which is useful for producing a high definition television image on direct-view devices, or on projection systems which utilize cathode ray tubes.

Another object of the present invention is to provide a dynamic focusing device for cathode ray tubes which is able to produce proper focus uniformity with respect to the entire surface of the cathode ray tube.

Still another object of the present invention is to provide a dynamic focusing device for cathode ray tubes that is easily adjustable.

To accomplish the foregoing, a preferred embodiment according to the present invention comprises:

crosshatch pattern generating means coupled to a video signal processing circuit and responsive to horizontal and vertical synchronizing signals, for providing a surface of cathode ray tubes with a crosshatch pattern indicating an adjustment point at which focusing control is carried out;

input means for choosing said adjustment point and for controlling the focus at said chosen adjustment point;

correction data setting means having a memory unit for storing correction data which is necessary for a proper focus about said adjustment point and to which said input means is coupled for producing said correction data;

interpolation data calculating means for producing interpolation data between two adjacent adjustment points located in a vertical direction by calculating the correction data of each of said two adjacent adjustment points;

latch and digital to analog converting means for converting said correction and interpolation data into an analog form; and output means having an interpolation filter for interpolating characteristics between two adjacent adjustment points located in a horizontal direction, coupled to said latch and digital to analog converting means for supplying an output signal to the dynamic focus circuit of said cathode ray tubes.

The invention itself, together with further objects and attendent advantages, will best be understood by reference to the following detailed description of the preferred embodiments, taken in conjunction with the accompanying drawings.

DESCRIPTION OF THE PREFERRED EMBODIMENTS

Figure 1:
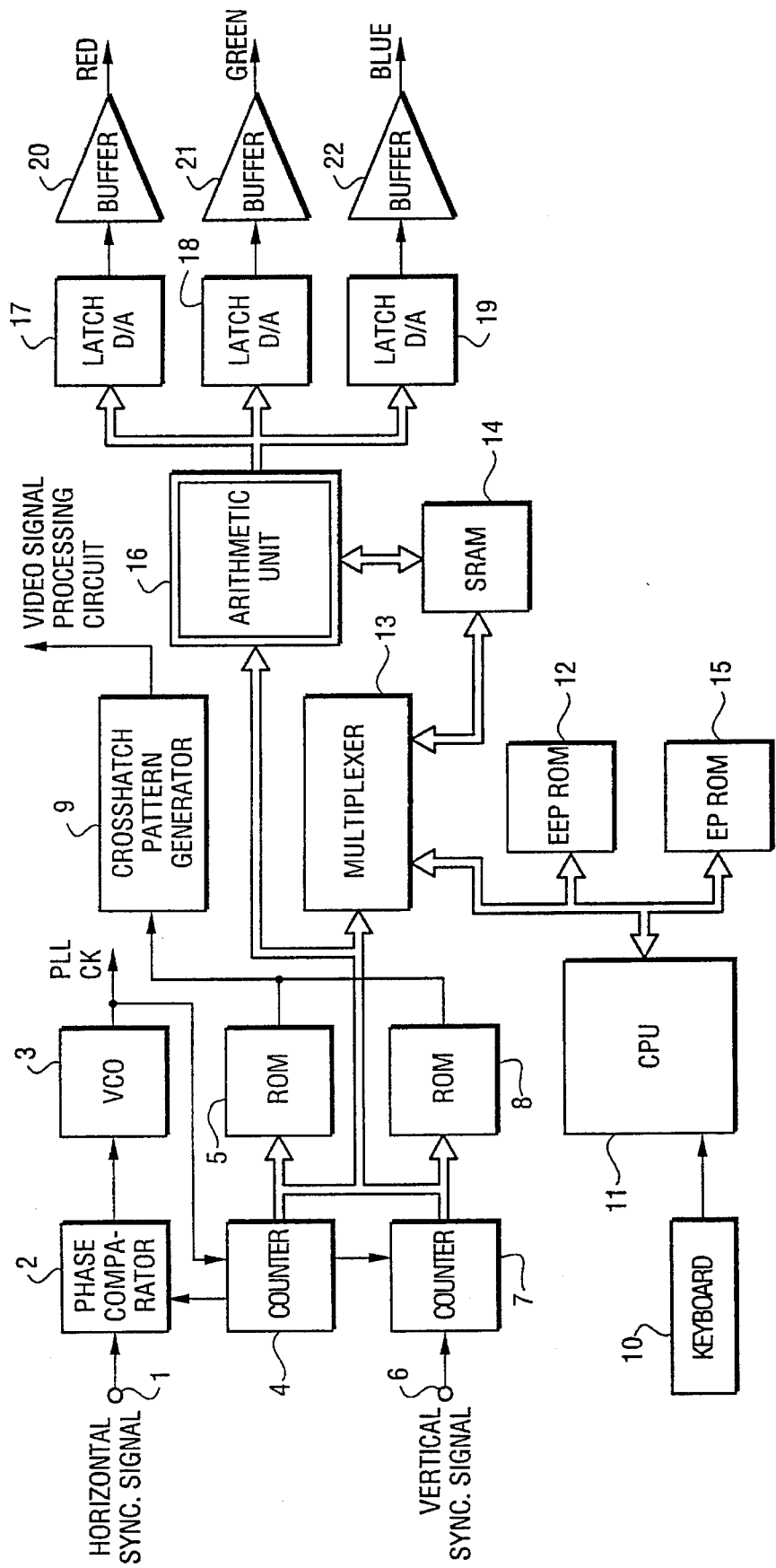
FIG. 1 is a circuit diagram of an embodiment of the dynamic focusing device for cathode ray tubes according to the present invention.

An embodiment of the dynamic focusing device according to the present invention is shown in FIG. 1. A horizontal synchronizing signal and a vertical synchronizing signal (such signals are included in composite television signals) are applied at an input terminal 1 and an input terminal 6. A phase of the horizontal synchronizing signal applied at the input terminal 1 is compared with that of an output of a counter 4 acting as a frequency divider by a phase comparator 2. A voltage controlled oscillator (VCO) 3 oscillates at a frequency controlled by an error signal appearing at an output of the phase comparator 2, the oscillation output being applied to the counter 4. Because the phase comparator 2, voltage controlled oscillator 3, and counter 4 constitute a phase locked loop (PLL), a clock signal synchronized with the horizontal synchronizing signal appears at the output terminal of the voltage controlled oscillator 3. The clock signal is divided in frequency by the counter 4, which also generates an address signal in order to form a vertical line signal of a crosshatch pattern used for focusing control. The vertical line signal of the crosshatch pattern is generated by read only memory (ROM) 5, in synchronicity with the generated address signal.

Similarly, the vertical synchronizing signal applied at the input terminal 6 is fed to a counter 7, which generates an address signal for forming a horizontal line signal of the crosshatch pattern. In accordance therewith, a ROM 8 generates the horizontal line signal of the crosshatch pattern in synchronicity with the generated address signal. A crosshatch pattern generator 9 forms the crosshatch pattern by combining the horizontal and vertical line signals, and supplies the resulting crosshatch pattern signals to a video signal processing circuit of direct-view television devices, projection television systems, or the like.

Correction data for facilitating a proper focus at an adjustment point is determined as follows. The adjustment point is an intersection of a vertical line and a horizontal line of the crosshatch pattern defined by arbitrarily divided blocks on the surface of the cathode ray tube. An adjustment point is chosen by operating a keyboard 10, whereby a central processing unit (CPU) 11 transmits an address signal to a static random access memory (SRAM) 14 through an electrically erasable and programmable read only memory (EEPROM) 12 and a multiplexer 13, in accordance with a program stored in an electrically programmable read only memory (EPROM) 15. The correction data at the chosen adjustment point can be determined by operating the keyboard 10 in such a way so as to obtain the proper focusing of the adjustment point of the crosshatch pattern displayed on the cathode ray tube surface, and by correcting the corresponding data stored in the SRAM 14 through the CPU 11 and the multiplexer 13.

The correction data stored in the SRAM 14 is written into the EEPROM 12 through the multiplexer 13 in each of the following situations: the selection of another adjustment point; the change of color channels; and the passage of a predetermined amount of time (for example, 30 seconds) after the correction data has been adjusted by the keyboard 10.

After the correction data has been stored in the SRAM 14 and the EEPROM 12, an arithmetic unit 16 produces an interpolation data for the entire cathode ray tube surface from the correction data of each adjustment point by the following process. The correction and interpolation data are determined around each of primary colors red, green, and blue, and are converted into analog signal form by latch and digital to analog converters 17, 18, and 19. The converted analog signals are fed to buffer amplifiers 20, 21, and 22, and produce dynamic focus correction signals. In the case of a conventional direct-view cathode ray tube, the color channel selection is not necessary, because the position of each color raster is the same. In the projection cathode ray tube, however, it is desirable to determine the correction and interpolation data around each color channel, because the shape of the raster is different tube by tube.

Figure 2:
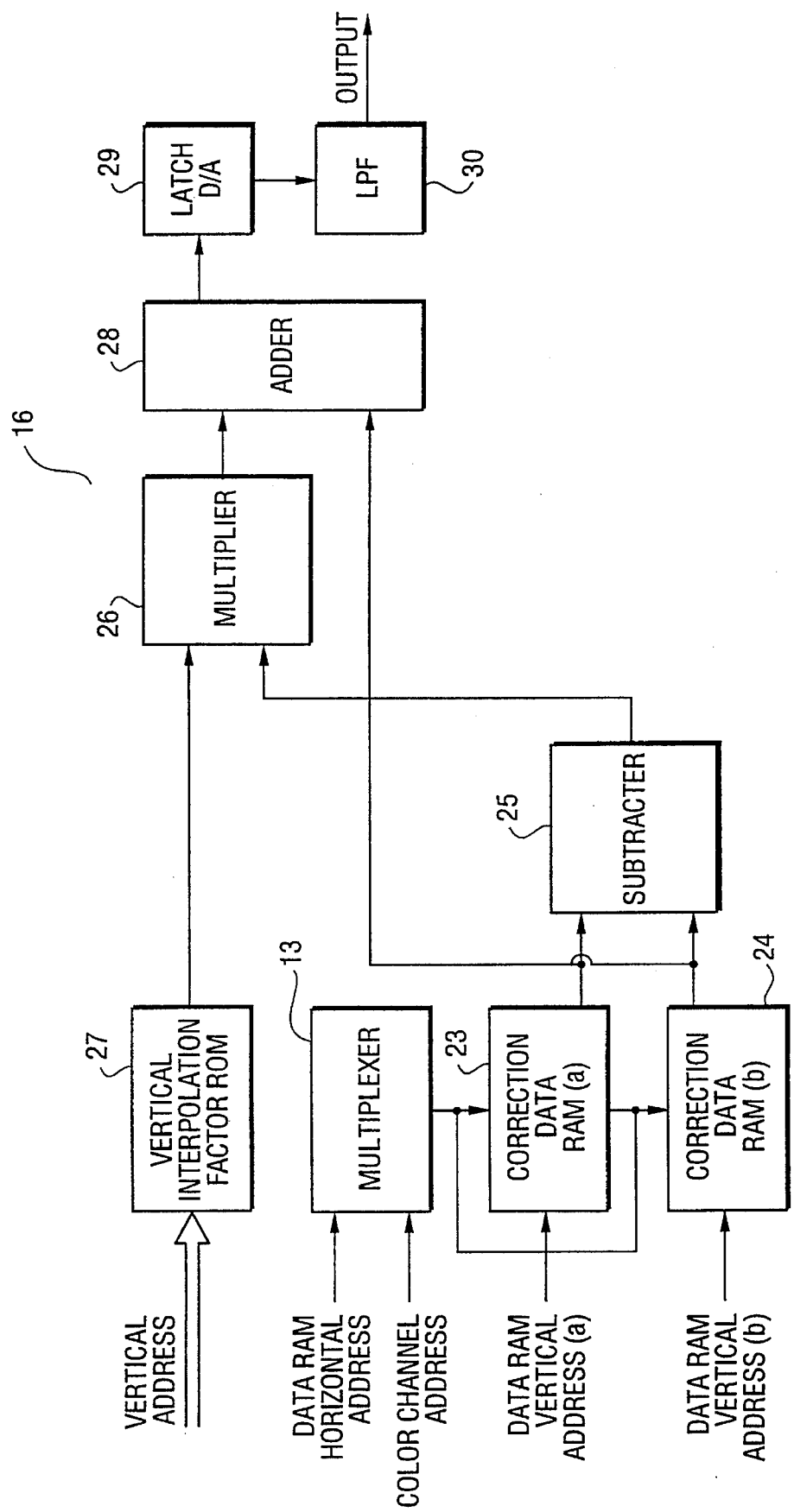
FIG. 2 is a detailed circuit diagram of the arithmetic unit shown in FIG. 1.
Figures 5A, 5B:
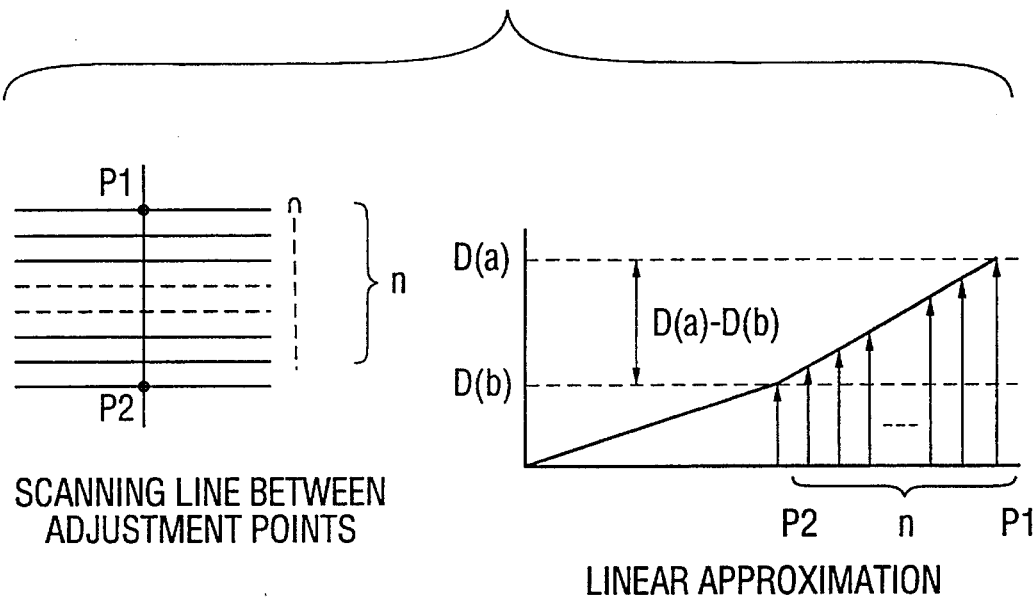
FIGS. 5A and 5B show an equation and a graph for illustrating an interpolation principle between two adjacent adjustment points located in a vertical direction.

Referring now to FIG. 2 and FIGS. 5A,5B, FIG. 2 shows the details of the arithmetic unit 16 shown in FIG. 1, while FIGS. 5A,5B show an interpolation equation and graph representing an interpolation principle. The number of adjustment points on one crosshatched horizontal line is equal to the number of the crosshatched vertical lines since the adjustment points exist at all of the cross points of the crosshatch. A data RAM exists corresponding to each crosshatched horizontal line, that is, the number of the data RAM is equal to the number of the crosshatched horizontal lines. Said data RAM is designated by the vertical address which corresponds to each crosshatched horizontal line. The correction data in all of the adjustment points on one crosshatched horizontal line are stored in the corresponding data RAM. The calculation of interpolation data between two adjacent adjustment points located on different horizontal scanning lines in a vertical direction is as follows, using the interpolation equation and principles shown in FIGS. 5A,5B. A data RAM vertical address (a) of an adjustment point P1 and a data RAM vertical address (b) of an adjustment point P2 are applied to a data RAM(a) 23 and a data RAM(b) 24 (see FIG. 2). Correction data D(a) and Correction data D(b) are output from the correction data RAM(a) 23 and the data RAM(b) 24. A subtracter 25 subtracts the correction data D(b) from the correction data D(a), and the resulting output is fed to a multiplier 26. The multiplier 26 multiplies the output of the subtracter 25 by a factor (=i/ number of horizontal scanning lines between the adjacent adjustment points) which is fed from a vertical interpolation factor ROM 27. The resulting output from the multiplier 26 is input to an adder 28. The adder 28 adds the correction data D(b) to the output of the multiplier 26, thereby calculating an interpolation value for each scanning line between the adjacent adjustment points P1 and P2. The above calculations are performed for each color channel, so that the interpolation value for each color channel may be determined.

Returning now to FIG. 2, the interpolation data for each horizontal scanning line determined by the above calculation is converted into analog form by the latch and digital to analog converter 29, and the resulting analog signal is fed to a low pass filter 30, which acts as an interpolating filter, so as to determine the interpolation data between two adjacent adjustment points located in a horizontal direction. Through production of this correction data and interpolation data, proper dynamic focus of the cathode ray tube may be achieved.

Figure 3:
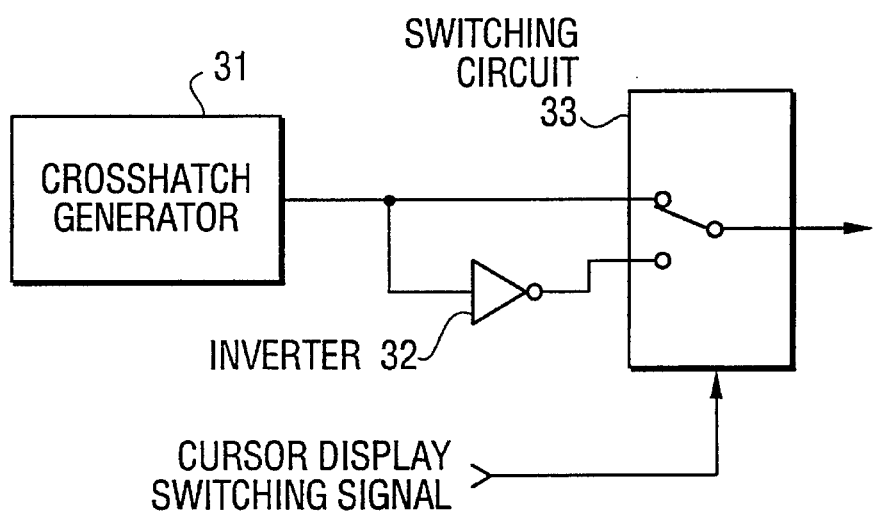
FIG. 3 is a circuit diagram of a crosshatch pattern generator which can be used in the dynamic focusing device in accordance with the present invention.
Figure 4:
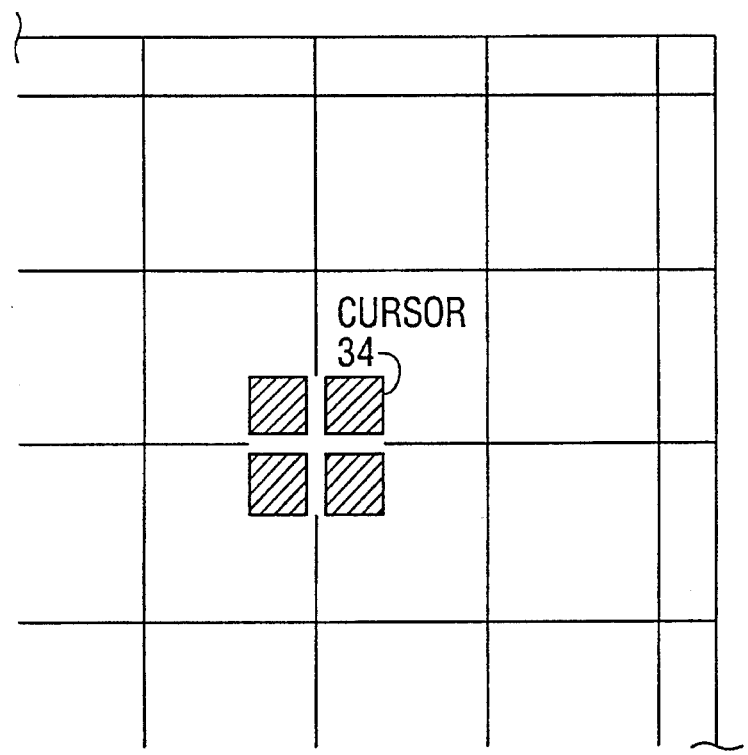
FIG. 4 is an illustrative view of a main portion of the crosshatch pattern which is formed by the circuit shown in FIG. 3.

FIGS. 3 and 4 show a circuit diagram and illustration of the crosshatch pattern used for proper adjustment of the dynamic focus. FIG. 4 shows the crosshatch pattern and a cursor 34 which indicates the adjustment point for performing the focusing control. The cursor 34 emits a white light (represented by the illustrated shaded portions). The brightness of the vertical and horizontal lines forming the crosshatch pattern is therefore reversed (i.e., dark) at the adjustment point. By using the pattern shown in FIG. 4, the adjustment point to be controlled is clearly delineated. Thus, by performing the focusing control in such a way that the reversed crosshatch line of the pattern is clearly distinguished, highly accurate correction data for proper focusing may be determined.

FIG. 3 shows the circuit diagram for producing the above-described crosshatch pattern. An output circuit of the crosshatch generator 31 divides into two paths. One path is directly connected to a switching circuit 33, and the other is connected to the switching circuit 33 through an invertor 32. The switching circuit 33 is switched by a cursor display switching signal fed from the CPU 11 (not shown), providing the crosshatch signal having reversed brightness at the adjustment point, as shown in FIG. 4.

The embodiments described above provide a number of significant advantages. As described above, the dynamic focusing device for cathode ray tubes according to the present invention can supply interpolated correction signals for producing proper focusing over the whole surface of a tube to focus coils or focus electrodes of the cathode ray tube. This advantage brings about excellent results for producing a high definition television image in direct-view television devices, projection television systems and other such systems. The described device is further advantageous in that it is easily adjustable.

The present invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A dynamic focusing device for cathode ray tubes, said device comprising:

a crosshatch pattern generating means responsive to horizontal and vertical synchronizing signals for providing a surface of said cathode ray tubes with a crosshatch pattern indicating an adjustment point at which focusing control is carried out, said crosshatch pattern generating means comprising circuit means for producing a cursor indicating the adjustment point for carrying out the focusing control, and for providing a brightness reversed crosshatch pattern at said adjustment point;

an input means for choosing said adjustment point and for controlling the focus at said chosen adjustment point;

a correction data setting means having a memory unit for storing a correction data necessary for proper focusing about said adjustment point, said correction data setting means being coupled to said input means in order to produce said correction data;

an interpolation data calculating means for producing an interpolation data between two adjacent adjustment points located in a vertical direction by calculating the correction data of said two adjacent adjustment points;

a latch and digital to analog converting means for converting said correction data and said interpolation data into an analog form; and an output means having an interpolation filter for interpolating characteristics between two adjacent adjustment points located in a horizontal direction, said output means being coupled to said latch and digital to analog converting means and supplying an output signal to said cathode ray tubes.

2. A dynamic focusing device for cathode ray tubes, said device comprising:

a crosshatch pattern generating means responsive to horizontal and vertical synchronizing signals for providing a surface of said cathode ray tubes with a crosshatch pattern indicating an adjustment point at which focusing control is carried out, said crosshatch pattern generating means comprising circuit means for producing a cursor indicating the adjustment point for carrying out the focusing control, and for providing a brightness reversed crosshatch pattern at said adjustment point;

an input means for choosing said adjustment point and for controlling the focus at said chosen adjustment point;

a correction data setting means having a memory unit for storing a correction data necessary for proper focusing about said adjustment point, said correction data setting means being coupled to said input means in order to produce said correction data;

an interpolation data calculating means for producing interpolation data between two adjacent adjustment points located in a vertical direction by calculating the correction data of said two adjacent adjustment points, said interpolation data calculating means comprising:

a subtracter for calculating a difference between the correction data of said two adjacent adjustment points located in a vertical direction, a multiplier for multiplying an output of said subtracter by a predetermined factor, and an adder for adding an output of said multiplier and one of the correction data of said two adjacent adjustment points;

a latch and digital to analog converting means for converting said correction data and said interpolation data into an analog form; and an output means having an interpolation filter for interpolating characteristics between two adjacent adjustment points located in a horizontal direction, said output means being coupled to said latch and digital to analog converting means and supplying an output signal to said cathode ray tubes.

3. A dynamic focusing device for cathode ray tubes, said device comprising:

a crosshatch pattern generator responsive to horizontal and vertical synchronizing signals for providing a surface of said cathode ray tubes with a crosshatch pattern indicating an adjustment point at which focusing control is carried out, said crosshatch pattern generator comprising a circuit for producing a cursor indicating the adjustment point for carrying out the focusing control, and for providing a brightness reversed crosshatch pattern at said adjustment point;

a keyboard for choosing said adjustment point and for controlling the focus at said chosen adjustment point;

a correction data setting circuit having a memory unit for storing a correction data necessary for proper focusing about said adjustment point, said correction data setting circuit being coupled to said keyboard in order to produce said correction data;

an interpolation data calculating circuit for producing an interpolation data between two adjacent adjustment points located in a vertical direction by calculating the correction data of said two adjacent adjustment points;

a latch and digital to analog converter for converting said correction data and said interpolation data into an analog form; and an output circuit having an interpolation filter for interpolating characteristics between two adjacent adjustment points located in a horizontal direction, said output circuit being coupled to said latch and digital to analog converter and supplying an output signal to said cathode ray tubes.

4. A dynamic focusing device for cathode ray tubes, said device comprising:

a crosshatch pattern generating means coupled to a video signal processing circuit of direct-view television devices or projection television systems responsive to horizontal and vertical synchronizing signals, which are included in composite television signals, for providing a surface of said cathode ray tubes with a crosshatch pattern indicating an adjustment point at which focusing control is carried out, said crosshatch pattern generating means comprising circuit means for producing a cursor indicating the adjustment point for carrying out the focusing control, and for providing a brightness reversed crosshatch pattern at said adjustment point;

an input means for choosing said adjustment point and for controlling the focus at said chosen adjustment point;

a correction data setting means having a memory unit for storing a correction data necessary for proper focusing about said adjustment point, said correction data setting means being coupled to said input means in order to produce said correction data;

an interpolation data calculating means for producing interpolation data between two adjacent adjustment points located in a vertical direction by calculating the correction data of said two adjacent adjustment points;

a latch and digital to analog converting means for converting said correction data and said interpolation data into an analog form; and an output means having an interpolation filter for interpolating characteristics between two adjacent adjustment points located in a horizontal direction, said output means being coupled to said latch and digital to analog converting means and supplying an output signal to said cathode ray tubes.

5. A dynamic focusing device for cathode ray tubes, said device comprising:

a crosshatch pattern generating means coupled to a video signal processing circuit of direct-view television devices or projection television systems responsive to horizontal and vertical synchronizing signals, which are included in composite television signals, for providing a surface of said cathode ray tubes with a crosshatch pattern indicating an adjustment point at which focusing control is carried out, said crosshatch pattern generating means comprising circuit means for producing a cursor indicating the adjustment point for carrying out the focusing control, and for providing a brightness reversed crosshatch pattern at said adjustment point;

an input means for choosing said adjustment point and for controlling the focus at said chosen adjustment point;

a correction data setting means having a memory unit for storing a correction data necessary for proper focusing about said adjustment point, said correction data setting means being coupled to said input means in order to produce said correction data;

an interpolation data calculating means for producing an interpolation data between two adjacent adjustment points located in a vertical direction by calculating the correction data of said two adjacent adjustment points, said interpolation data calculating means comprising:

a subtracter for calculating a difference between the correction data of said two adjacent adjustment points located in a vertical direction, a multiplier for multiplying an output of said subtracter by a predetermined factor, and an adder for adding an output of said multiplier and one of the correction data of said two adjacent adjustment points;

a latch and digital to analog converting means for converting said correction data and said interpolation data into an analog form; and an output means having an interpolation filter for interpolating characteristics between two adjacent adjustment points located in a horizontal direction, said output means being coupled to said latch and digital to analog converting means and supplying an output signal to said cathode ray tubes.

\* \* \* \* \*